United States Patent [19]

Zalman

[11] Patent Number: 5,054,841
[45] Date of Patent: Oct. 8, 1991

[54] PORTABLE PICKUP TRUCK CAMPER SHELL STANDARD OR ROLL BAR MODEL

[76] Inventor: George R. Zalman, 15246 N. Delray Dr., Fountain Hills, Ariz. 85268

[21] Appl. No.: 618,975

[22] Filed: Nov. 28, 1990

[51] Int. Cl.$^5$ .............................................. B60P 3/33
[52] U.S. Cl. .................................. 296/165; 296/100; 296/102; 296/104
[58] Field of Search ................ 296/27, 100, 102, 104, 296/156, 164, 165

[56] References Cited

U.S. PATENT DOCUMENTS

| | | | |
|---|---|---|---|
| 2,463,646 | 3/1949 | Schassberger | 296/104 |
| 2,565,746 | 8/1951 | Turner | 296/104 |
| 2,925,303 | 2/1960 | Lane | 296/102 |
| 4,202,579 | 5/1980 | Berggren | 296/102 X |
| 4,310,194 | 1/1982 | Biller | 296/100 X |
| 4,813,734 | 3/1989 | Hoover | 296/100 |

FOREIGN PATENT DOCUMENTS 167326  9/1984  Japan ............................. 296/100

*Primary Examiner*—Margaret A. Focarino
*Assistant Examiner*—Andrew C. Pike

[57] ABSTRACT

A pickup truck camper shell is made of heavy-duty vinyl having fixed clear vinyl windows and zippered opening in rear. The vinyl is sewn to fit a three-piece pipe frame that slides vertically into inserts mounted to the bed of pickup truck. The shell drapes over frame and bottom of shell snaps to perimeter of pickup truck bed. The inserts are made of short pieces of pipe having a larger diameter than pipe of frame and plugged at the bottom. These inserts are mounted to L-shaped brackets that bolt to the inside sides of pickup truck bed. The inserts fasten to the brackets using steel straps. This portable shell is of foldable and knockdown construction for easy handling and storage. The portable pickup truck shell is angled in on all sides, flat on top, and is two-thirds the height of a pickup truck cab. There are two models of the portable camper shell, a roll bar and a non-roll bar model. The roll bar model has cut outs in the vinyl shell allowing the shell to mount under roll bar and the L-brackets are eliminated; the inserts are mounted directly to base of roll bar legs. Other than these differences, both versions of the portable pickup truck camper shell are identical.

8 Claims, 2 Drawing Sheets

PORTABLE PICKUP TRUCK CAMPER SHELL STANDARD OR ROLL BAR MODEL

BACKGROUND OF THE INVENTION

1. Field of the Invention

This invention relates in general to camper shells, and more particularly to a soft portable pickup truck camper shell of the type including a quickly removable, three-piece frame, inserts, and snaps to fasten shell to pickup truck bed.

2. Prior Art

Camper shells for pickup trucks are generally bulky and heavy. Installation and removal of a standard camper shell is difficult for one person.

Standard camper shells are inconvenient to take off and put on frequently, and they need a lot of room for storage. The portable camper shell is easy to put on and remove, and it folds up like a toneau cover or tarp.

SUMMARY OF THE INVENTION

The principle object of the present invention is to provide a pickup truck camper shell that is light weight, is easily installed and removed by one person, and is compact for easy storage.

It is also an object of the present invention to provide such a device which is portable enough to store behind the seat of a pickup truck.

A further object of present invention is to provide such a device for pickup truck owners who don't want a permanent camper shell on their pickup truck. This invention gives the pickup truck owner the option to carry the portable camper shell with them in the truck and put it on when needed.

The final object of this invention as stated here is to provide a version of the portable pickup truck camper shell that will fit a pickup truck equipped with a roll bar. The two versions are identical with the exception of cut outs for roll bar and elimination of L-brackets.

The aforementioned objects can be accomplished by providing two versions of a camper shell made of heavy-duty vinyl or some other waterproof, stretchable material sewn to fit the frame it rests on, and having an opening flap in the rear and small fixed windows on each side. Snaps or other like fasteners attach shell to perimeter of pickup truck bed.

The three-piece frame supporting the shell is made of steel pipe which is bent to form a flat top, angled sides, and generally only being two-thirds the height of pickup truck cab. The three frame members slide into inserts which are usually four inch long pieces of larger diameter pipe plugged at the bottom. They are attached to the inside of the pickup truck bed (or the base of the roll bar legs, depending upon which version of shell) by using steel brackets, straps, and clamps.

DETAILED DESCRIPTION

Figure 1:
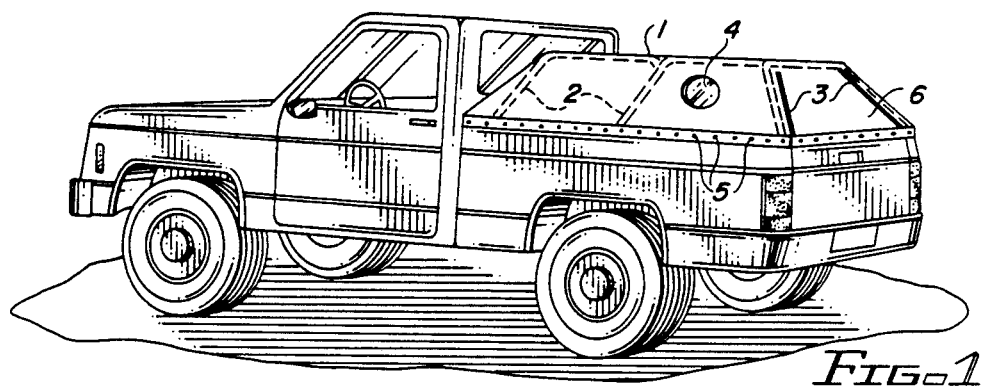
FIG. 1 is a side elevation of portable camper shell mounted on pickup truck.
Figure 4:
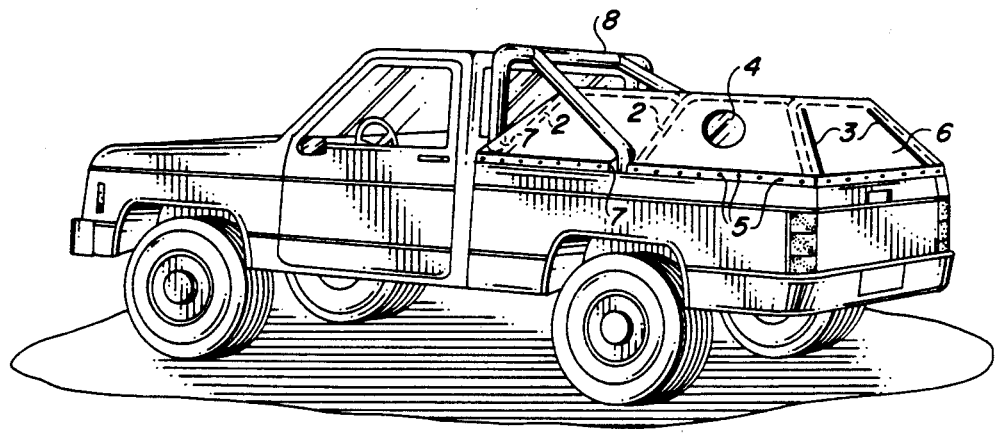
FIG. 4 is a side elevation of the portable camper shell roll bar version mounted on a pickup truck.

As shown in the drawings, the portable pickup truck camper shell in accordance with the present invention includes a soft vinyl shell that attaches to the perimeter of pickup bed with snaps or like fasteners. The shell 1 is made of a type of material that is flexible, waterproof, and stretchable. This material is sewn to fit the three-piece quickly removable frame 2. The shell rests on the frame as shown in FIG. 1 of the drawings. The shell 1 has a round window 4 on each side. Windows are made of clear flexible vinyl. There is an opening flap 6 in the rear of shell that opens by unsnapping snaps 5 on bottom of the flap and unzipping the two zippers 3. FIG. 4 shows cut outs in the roll bar version of the portable pickup truck camper shell.

Figure 2:
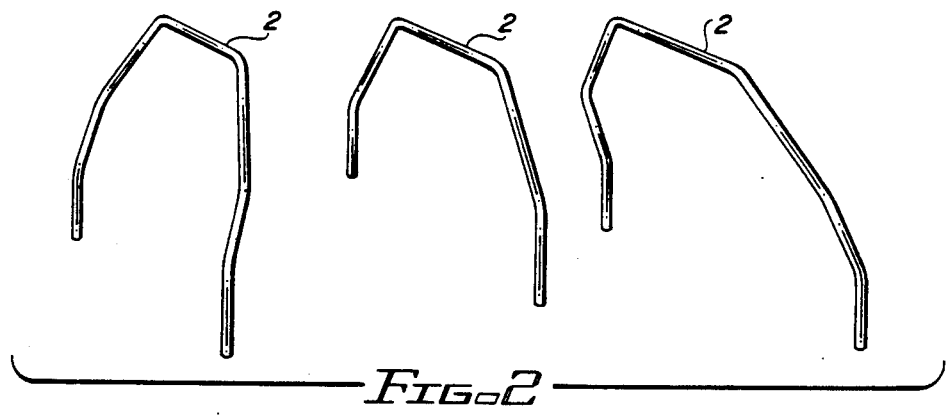
FIG. 2 is a side elevation of the three quickly removable frame pieces of the present invention.

As shown in FIG. 2 the three-piece frame 2 is made of galvanized steel pipe. The frame pieces are bent inward on all sides to make slanted sides and a flat roof.

Figure 3:
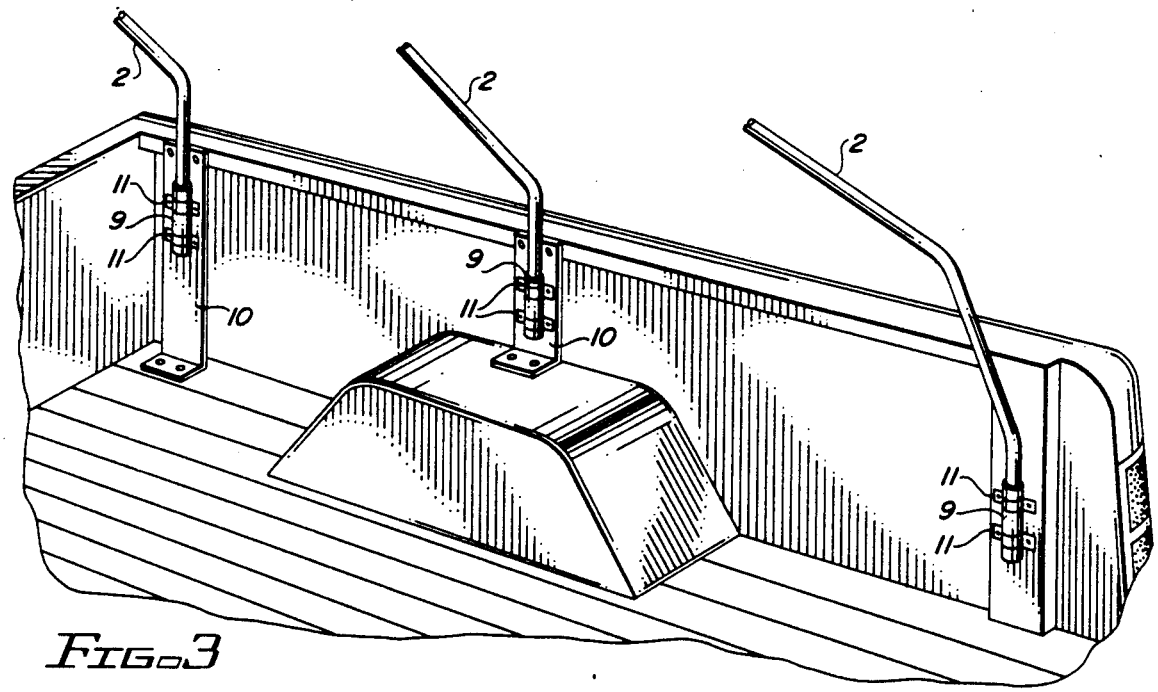
FIG. 3 is a view of brackets, straps, and inserts used to hold three-piece frame in place in present invention.

FIG. 3 shows inserts 9 attached to L-brackets 10 using steel straps 11 and L-brackets mounted to inside sides of pickup truck bed using bolts. The L-brackets are only used in the non-roll bar version of the portable pickup truck, camper shell. The L-brackets mount to the front and the middle of the sides of the pickup truck bed. The front L-brackets mount to the floor and the top of the truck bed. The middle L-brackets mount to the top of the wheel well and the top of the bed. The rear end of the pickup truck bed needs no L-brackets; here inserts 9 usually mount directly to rear bed supports of the pickup truck using steel straps., Inserts are usually made of galvanized steel pipe plugged at the bottom and usually four inches long. The inserts pipe has a slightly larger diameter than the pipe used to make the frame, allowing the frame to slide into the inserts snugly.

Figure 5:
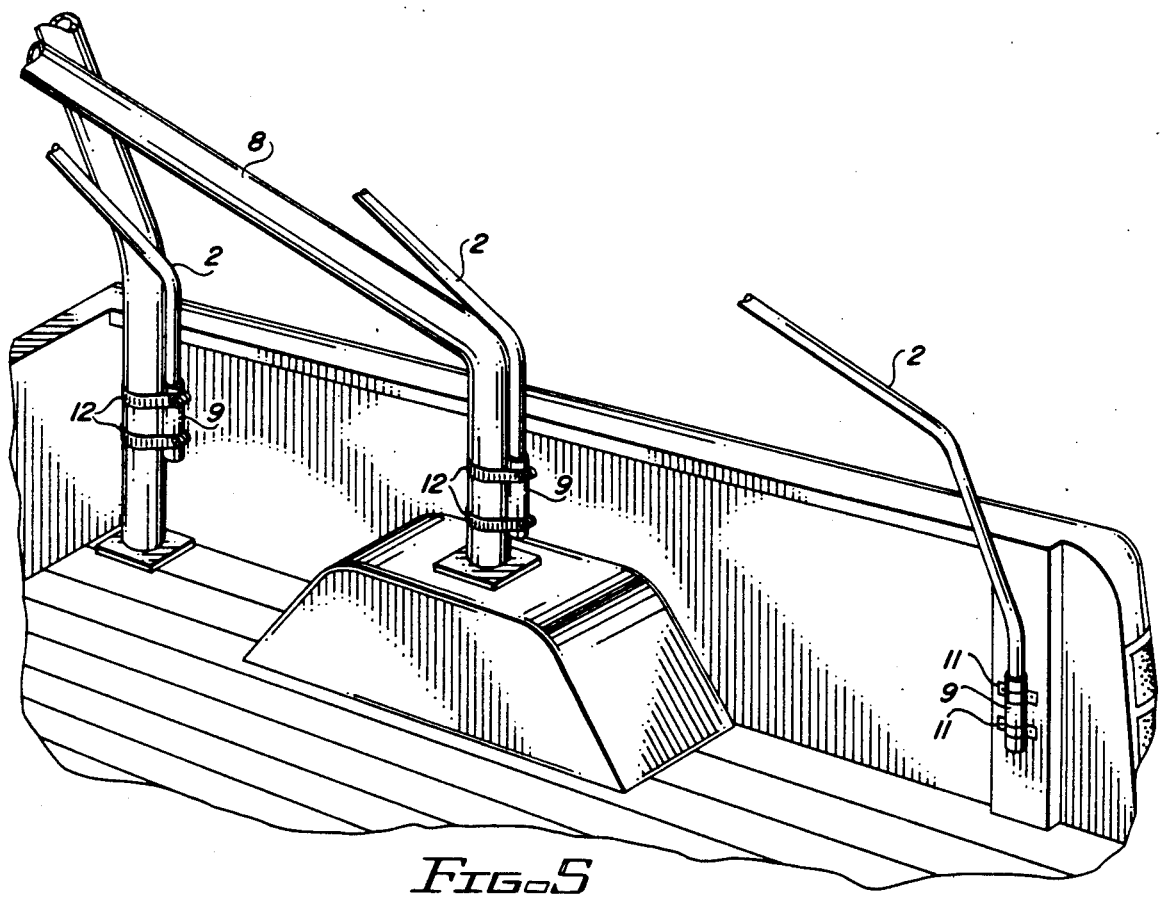
FIG. 5 is a view of inserts mounted to the roll bar using steel clamps. Also shown is the quickly removable frame of present invention slid into place.

Pickup trucks equipped with a roll bar use steel clamps 12 to mount the inserts directly to the base of the roll bar legs. See FIG. 5.

FIG. 1 shows a non-roll bar version of the portable camper shell.

FIG. 4 shows a roll bar version of the portable camper shell. Both versions of the portable camper shell are two-thirds the height of the pickup truck cab and bend inward on all sides, providing good visibility from the driver's seat, and are low enough to see over the top using the rear-view mirror.

I claim:

1. A portable pickup truck camper shell, for enclosing a bed of a pickup truck, comprising:
   a quickly removable frame;
   a plurality of inserts to secure the frame in place, wherein the frame is slid into said inserts;
   mounting means for permanently mounting said inserts onto the bed; and
   a cover;
   wherein: the cover is made of heavy-duty plastic material and is made to fit onto the frame; and said mounting means comprises straps, clamps, and L-shaped brackets.

2. A portable pickup truck camper shell as claimed in claim 1, wherein said straps, clamps, and L-shaped brackets are made of steel.

3. A portable pickup truck camper shell as claimed n claim 1, wherein said frame is secured in place by said mounting means.

4. A portable pickup truck camper shell as claimed in claim 1, wherein the shell has a height which is approximately two-thirds of a height of a cab of the truck.

5. A portable pickup truck camper shell, for enclosing a bed of a pickup truck having a roll bar, comprising:
 a quickly removable frame;
 a plurality of inserts to secure the frame in place, wherein the frame is slid into said inserts;
 mounting means for permanently mounting said inserts onto the bed; and
 a cover;

wherein: the cover is made of a heavy-duty plastic material and is made to fit onto the frame; the cover includes cut-outs through which the roll bar passes; said mounting means comprises straps and clamps; and some of said inserts are mounted to the roll bar with some of the mounting means.

6. A portable pickup truck camper shell as claimed in claim 5, wherein the L-shaped brackets, the straps, and the clamps are all made of steel.

7. A portable pickup truck camper shell claimed in claim 5, wherein said frame is secured in place by said mounting means.

8. A portable pickup truck camper shell claimed in claim 5, wherein the shell has a height which is approximately two-thirds of a height of a cab of the truck.

* * * * *